United States Patent
Cook et al.

(10) Patent No.: US 6,760,634 B2
(45) Date of Patent: *Jul. 6, 2004

(54) SYSTEM AND METHOD FOR PERIODIC TASK RESUMPTION FOLLOWING REDUNDANT CONTROL SYSTEM SWITCHOVER

(75) Inventors: William Cook, Northfield, OH (US); Mark Flood, Mayfield Hts., OH (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 568 days.

This patent is subject to a terminal disclaimer.

(21) Appl. No.: 09/761,986

(22) Filed: Jan. 17, 2001

(65) Prior Publication Data

US 2002/0095221 A1 Jul. 18, 2002

(51) Int. Cl.[7] .............................................. G05B 9/02
(52) U.S. Cl. .............................. 700/82; 700/2; 700/19; 700/20; 700/14; 714/11; 714/12
(58) Field of Search ............................ 700/2, 19, 20, 700/79, 82, 14; 714/11, 12; 709/102, 103; 307/141

(56) References Cited

U.S. PATENT DOCUMENTS

| | | | |
|---|---|---|---|
| 5,689,398 A | 11/1997 | Miller et al. ................ 361/189 |
| 5,777,874 A | 7/1998 | Flood et al. .................. 700/82 |
| 5,963,448 A | 10/1999 | Flood et al. .................. 700/82 |
| 5,966,300 A | 10/1999 | Flood et al. ................... 700/2 |
| 5,966,301 A | 10/1999 | Cook et al. .................... 700/3 |
| 5,997,166 A | 12/1999 | Flood ........................... 700/2 |
| 6,061,600 A | * 5/2000 | Ying ............................. 700/3 |
| 6,411,857 B1 | * 6/2002 | Flood ........................... 700/4 |
| 6,519,720 B1 | * 2/2003 | Mores .......................... 714/43 |

* cited by examiner

Primary Examiner—Ramesh Patel
Assistant Examiner—Crystal J Barnes
(74) Attorney, Agent, or Firm—Amin & Turocy LLP; R. Scott Speroff (57) ABSTRACT

A method and apparatus are disclosed for performing timely execution of periodic tasks in a redundant control system. A secondary controller in the redundant system receives a wakeup time array having at least one wakeup time element corresponding to a periodic task as well as a current time value from a primary controller, and schedules a run time for the periodic task at switchover based on the wakeup time element and the current time value from the primary control module. The secondary controller may further receive a task instance corresponding to the periodic task from the primary control module, and schedule a run time for the periodic task at switchover based on the task instance. In addition, the secondary controller may schedule a run time for the periodic task at switchover based on a default period associated with the periodic task, if no task instance and no wakeup time element were received corresponding to the periodic task.

33 Claims, 9 Drawing Sheets

SYSTEM AND METHOD FOR PERIODIC TASK RESUMPTION FOLLOWING REDUNDANT CONTROL SYSTEM SWITCHOVER

TECHNICAL FIELD

The present invention relates to the art of industrial controllers, and more particularly to a system and method for resumption of periodic tasks following a redundant control system switchover.

BACKGROUND OF THE INVENTION

Industrial controllers are special purpose computers used for controlling industrial processes, manufacturing equipment, and other factory automation applications. In accordance with a control program, an industrial controller may measure one or more process variables or inputs reflecting the status of a controlled process, and change outputs effecting control of the process. The inputs and outputs may be binary, (e.g., on or off), as well as analog inputs and outputs assuming a continuous range of values. The control program may be executed in a series of execution cycles with batch processing capabilities.

The measured inputs received from a controlled process and the outputs transmitted to the process generally pass through one or more input/output (I/O) modules. These I/O modules serve as an electrical interface between the controller and the controlled process, and may be located proximate or remote from the controller. The inputs and outputs are recorded in an I/O table in processor memory. Input values may be asynchronously read from the controlled process by one or more input modules and output values are written directly to the I/O table by the processor for subsequent communication to the process by specialized communications circuitry. An output module may interface directly with a controlled process, by providing an output from an I/O table to an actuator such as a motor, valve, solenoid, and the like.

During execution of the control program, values of the inputs and outputs exchanged with the controlled process pass through the I/O table. The values of inputs in the I/O table are asynchronously updated from the controlled process by dedicated scanning circuitry. This scanning circuitry may communicate with input and/or output modules over a bus on a backplane or network communications. The scanning circuitry also asynchronously writes values of the outputs in the I/O table to the controlled process. The output values from the I/O table are then communicated to one or more output modules for interfacing with the process. Thus, the processor may simply access the I/O table rather than needing to communicate directly with the controlled process.

An industrial controller may be customized to a particular process by writing control software that may be stored in the controller's memory and/or by changing the hardware configuration of the controller to match the control task. In distributed control systems, controller hardware configuration is facilitated by separating the industrial controller into a number of control modules, each of which performs a different function. Particular control modules needed for the control task may then be connected together on a common backplane within a rack and/or through a network or other communications medium. The control modules may include processors, power supplies, network communication modules, and I/O modules exchanging input and output signals directly with the controlled process. Data may be exchanged between modules using a backplane communications bus, which may be serial or parallel, or via a network. In addition to performing I/O operations based solely on network communications, smart modules exist which may execute autonomous logical or other programs.

Various control modules of a distributed industrial control system may be spatially distributed along a common communication link in several racks. Certain I/O modules may thus be located in close proximity to a portion of the control equipment, and away from the remainder of the controller. Data is communicated with these remote modules over a common communication link, or network, wherein all modules on the network communicate using a standard communications protocol.

In a typical distributed control system, one or more I/O modules are provided for interfacing with a process. The outputs derive their control or output values in the form of a message from a master or peer device over a network or a backplane. For example, an output module may receive an output value from a processor, such as a programmable logic controller (PLC), via a communications network or a backplane communications bus. The desired output value is generally sent to the output module in a message, such as an I/O message. The output module receiving such a message will provide a corresponding output (analog or digital) to the controlled process. Input modules measure a value of a process variable and report the input values to a master or peer device over a network or backplane. The input values may be used by a processor (e.g., a PLC) for performing control computations.

Conventional control devices typically provide a run mode wherein a module executes a control program and a configure mode wherein the control program execution is suspended. As control systems become more widely distributed, the logic or control program associated with a particular process or system may be executed on a large number of modules or devices. In this way, individual processors in the devices execute a program autonomously from the rest of the system components. Smart devices, such as I/O modules, transducers, sensors, valves, and the like may thus be programmed to execute certain logical or other programs or operations independently from other such devices.

In many control systems, redundant control devices are provided in order to further ensure proper control of a process or machine in the event of a device failure. Such redundant control systems may be employed, for example, where the operation of the controlled process or machine is in some manner critical. Thus, primary and secondary controllers may be provided in a control system, wherein the primary controller runs the process and the secondary controller is adapted to assume control if the primary controller fails. Such controllers typically execute or run various tasks, some of which may be periodic in nature. In conventional redundant control systems, however, it is difficult or impossible to guarantee the periodicity of such periodic tasks upon switchover from the primary controller to the secondary controller. Thus, there is a need for improved methods and apparatus by which timely execution of periodic tasks may be improved in redundant control systems following a switchover event.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

A method and apparatus are disclosed for performing timely execution of periodic tasks in a redundant control system. A secondary controller in the redundant system receives a wakeup time array having one or more wakeup time elements corresponding to periodic tasks, as well as a current time value from a primary controller. For example, the array may include entries for each periodic task and a corresponding element representing an estimated wakeup or execution time for the task. The array may be provided from the redundant primary controller to the secondary controller, for example, across a system redundancy module bridge. The secondary controller then schedules a run time for the periodic tasks at switchover based on the wakeup time elements and the current time value from the primary controller.

In the situation where the primary and secondary controllers determine task execution times according to internal timers (e.g., 1 $\mu$s timers), the primary may provide the secondary with its internal timer count value when sending the wakeup time array information. The secondary controller may then use this primary current time value to compute a correlation or correction factor based on a comparison of its internal timer count value and the corresponding value received from the primary. This correction factor may then be used to scale the periodic task time values in the array on the secondary such that if a switchover occurs, the secondary will timely process the periodic tasks.

The secondary controller may further receive a task instance corresponding to a periodic task from the primary control module, such as when the task is readied for execution by the primary controller, and may receive synchronization information to determine when the task has completed on the primary. The secondary controller may then schedule a run time for the periodic task at switchover based on the task instance. The task instance may comprise, for example, a task identifier or instance number, from which the secondary controller may determine which periodic task has been readied for execution in the primary. Using this, and the time at which the task instance was received by the secondary controller, the periodic task may be scheduled for execution according to the time when it was readied for execution on the primary controller, and a period associated with the periodic task.

If no such task instance has been received, the value from the array will be used to schedule the next run time for the periodic task. Where no task instance has been received and no wakeup time array element is present for a given periodic task, the task pends itself on the new primary for its default period. The methodology thus facilitates redundant system switchovers causing minimal or no intrusion into the periodicity of periodic tasks.

If a task instance was received from the primary, but no state information has been received to indicate that the primary had completed the task, then the secondary (e.g., the new primary) will immediately execute the task at switchover.

One aspect of the present invention provides a method for operating a primary controller in a redundant control system. According to the method, the primary controller sends wakeup time information to the secondary controller during qualification of the secondary controller. The wakeup time information includes one or more wakeup time values corresponding to periodic tasks associated with the process, and may be in the form of an array. The primary controller may further send a current time value to the secondary controller during qualification of the secondary controller. The wakeup time information and the primary current time value may, but need not be, included within a single message or packet transferred from the primary controller to the secondary controller. For example, the wakeup time information and the current primary time value may be sent to the secondary controller via a system module redundancy bridge or the like.

The method may further include sending a task instance associated with a periodic task to the secondary controller as the periodic task is readied for execution if the secondary controller is qualified. The secondary controller may, in turn, record the time the task instance was received, and use this to schedule an execution or run time for the periodic task, should a switchover event take place. This provides updated information relating to the periodicity of the periodic task in addition to that provided by the wakeup time array sent to the secondary controller during qualification.

According to another aspect of the present invention, there is provided a method for operating a secondary controller in a redundant control system. The method comprises obtaining wakeup time information (e.g., a wakeup time array) from a primary controller during qualification of the secondary controller, wherein the wakeup time information comprises one or more wakeup time values corresponding to one or more periodic tasks associated with a controlled process. The method further comprises running or executing at least one periodic task according to the wakeup time information from the primary controller after a switchover event. The secondary controller may further obtain a current primary time value from the primary controller during qualification of the secondary controller, and may correct the wakeup time information according to the current primary time value and a current secondary time value. In this regard, running at least one periodic task according to the wakeup time information may comprise running the periodic task according to the corrected wakeup time information.

The correction of the wakeup time information may include performing a comparison of the current primary time value from the primary controller with the current secondary time value, generating a current time correction value according to the comparison, and scaling the wakeup time information from the primary controller to obtain the corrected wakeup time information. Thus, where the primary and secondary controllers operate autonomous timers (e.g., hardware or software controlled timers), a correction or correlation between the values thereof may be derived by the secondary controller, in order to scale or correct the wakeup time information obtained from the primary controller.

The method may further comprise obtaining at least one task instance from the primary controller when the secondary controller is qualified. The task instance may include information relating to the execution of the periodic task by the primary controller, such as an indication that the task has been readied for execution, or that execution has been completed. The secondary controller may then run the periodic task according to the task instance after a switchover event. For example, the task instance may identify a periodic task, wherein running the periodic task in the secondary controller after a switchover event may comprise scheduling the task for execution according to the time when the task instance was obtained from the primary controller.

In this regard, scheduling the periodic task for execution may comprise computing a reschedule time according to the time when the task instance was obtained and a default period associated with the periodic task.

In the case where the secondary has been notified that the task has been readied for execution, but has not been notified that the task has completed execution, the secondary will immediately execute the task after a switchover.

Yet another aspect of the invention includes a primary controller for controlling a process in a redundant control system. The primary controller is adapted to send wakeup time information to the secondary controller during qualification of the secondary controller, wherein the wakeup time information comprises at least one wakeup time value corresponding to a periodic task associated with the process. The controller may be further adapted to send a current time value to the secondary controller during qualification of the secondary controller, and to send a task instance associated with a periodic task to the secondary controller as a periodic task is readied for execution if the secondary controller is qualified.

According to still another aspect of the invention, there is provided a secondary controller adapted to assume control of a process from a primary controller in a redundant control system upon a switchover event. The secondary controller is adapted to obtain wakeup time information from the primary controller during qualification of the secondary controller, wherein the wakeup time information comprises at least one wakeup time value corresponding to a periodic task associated with the process. The secondary controller is further adapted to run the periodic task according to the wakeup time information from the primary controller after a switchover event.

In addition, the secondary controller may be adapted to obtain a current primary time value from the primary controller during qualification, and to correct the wakeup time information according to the current primary time value and a current secondary time value. The periodic task may accordingly be run based on the corrected wakeup time information. The secondary controller may be further adapted to obtain a task instance from the primary controller when the secondary controller is qualified, wherein the task instance comprises information relating to the execution of at least one task by the primary controller. In this case, the secondary controller may run the periodic task according to the task instance after a switchover event.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings.

DETAILED DESCRIPTION OF THE INVENTION

Figure 1:
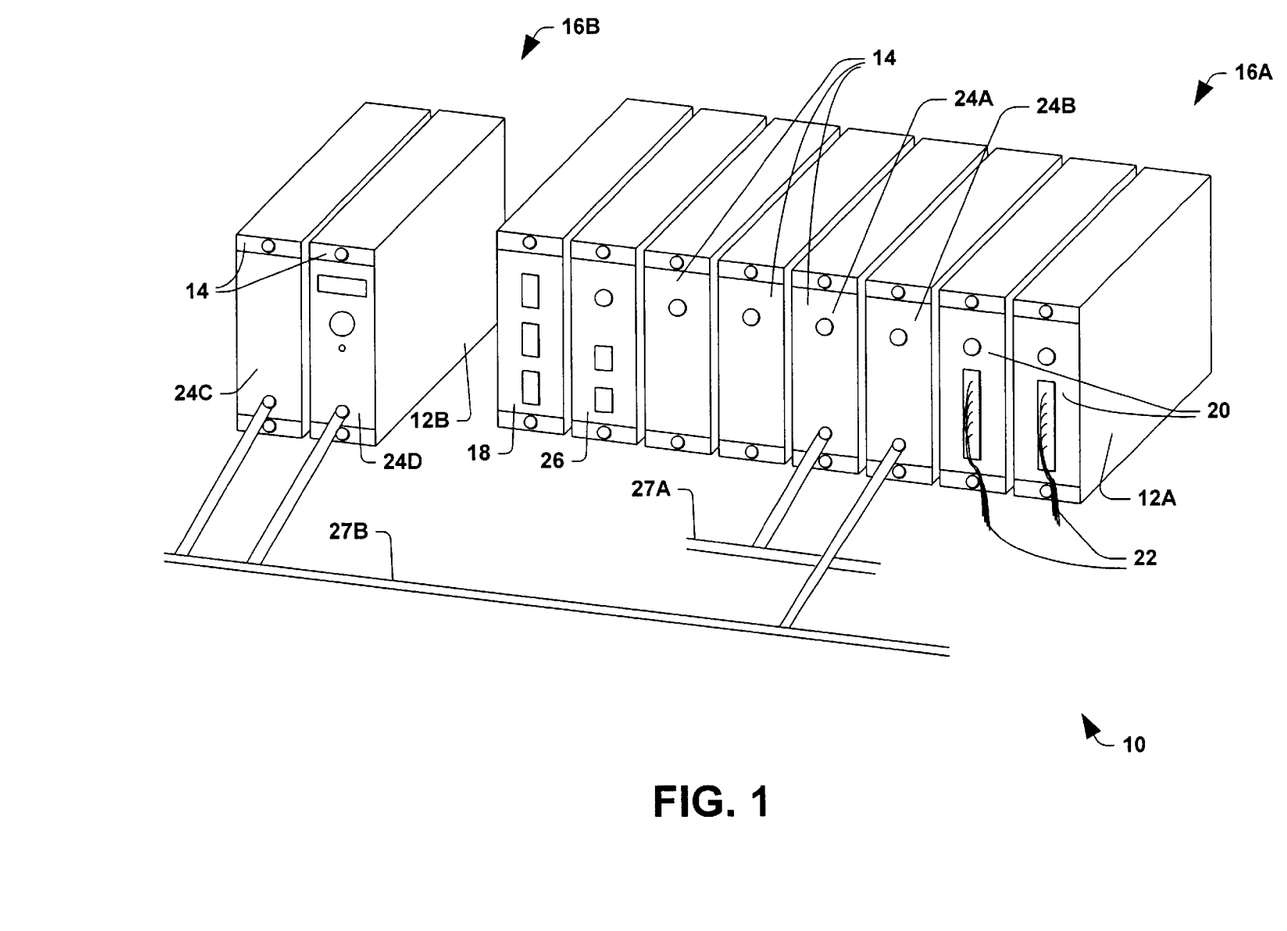
FIG. 1 is a perspective illustration of an industrial controller having multiple functional modules included within several racks joined by communication links.

The various aspects of the present invention will now be described with reference to the drawings, wherein like reference numerals are used to refer to like elements throughout. The invention provides a system and methodology by which timely execution of periodic tasks is achieved in a redundant control system. In order to provide context for the invention, a distributed control system is now illustrated and described, in which various aspects of the invention may be employed. Referring initially to FIG. 1, a distributed industrial control system 10 suitable for use with the present invention provides a first and second rack 12A and 12B for holding a number of functional modules 14 electrically interconnected by backplanes 16A and 16B running along the rear of the racks 12A and 12B respectively. Each module 14 may be individually removed from the rack 12A or 12B thereby disconnecting it from its respective backplane 16 as will be described below for repair or replacement and to allow custom configuration of the distributed system 10.

The modules 14 within the rack 12A may include, for example, a power supply module 18, a processor module 26, two communication modules 24A and 24B and two I/O modules 20. A power supply module 18 receives an external source of power (not shown) and provides regulated voltages to the other modules 14 by means of conductors on the backplane 16A. The I/O modules 20 provide an interface between inputs from, and outputs to external equipment (not shown) via cabling 22 attached to the I/O modules 20 at terminals on their front panels. The I/O modules 20 convert input signals on the cables 22 into digital words for transmission on the backplane 16A. The I/O modules 20 also convert other digital words from the backplane 16A to the necessary signal levels for control of equipment.

The communication modules 24A and 24B provide a similar interface between the backplane 16A and one of two external high speed communication networks 27A and 27B. The high speed communication networks 27A and 27B may connect with other modules 14 or with remote racks of I/O modules 20 or the like. In the example illustrated in FIG. 1, the high speed communication network 27A connects with backplane 16A via the communication module 24A, whereas the high speed communication network 27B connects the communication module 24B with communication modules 24C and 24D in rack 12B. The processor module 26 processes information provided by the communication modules 24A and 24B and the I/O modules 20 according to a stored program and provides output information to the communication module 24 and the I/O modules 20 in response to that stored program and received input messages.

The methodologies illustrated and described hereinafter may be implemented in the system 10, for example, wherein redundant primary and secondary modules (e.g., processor module 26) are provided for control of a critical process. In a redundant control system, a primary controller and a secondary controller are provided, both of which are operatively associated with a controlled process or machine, in order to control the process or machine. In this regard, the secondary controller may assume one of several states, reflecting the current capability to assume control of the process in the event of a switchover. For instance, the secondary controller may be in a disqualified state, indicating that the secondary controller is incapable of assuming control from the primary. Another such state may be referred to as 'synchronized' or 'qualified', which may indicate that the secondary has an up-to-date version of data, connections, and program state, and is thus capable of assuming control in the event of a primary controller failure or other switchover event. Another possible state may be referred to as 'synchronizing', 'synchronization', 'qualifying', or 'qualification', which indicates a transition between disqualified and qualified status. It will be appreciated that the primary and secondary controllers may each be adapted to operate in primary controller and secondary controller modes.

Figure 2:
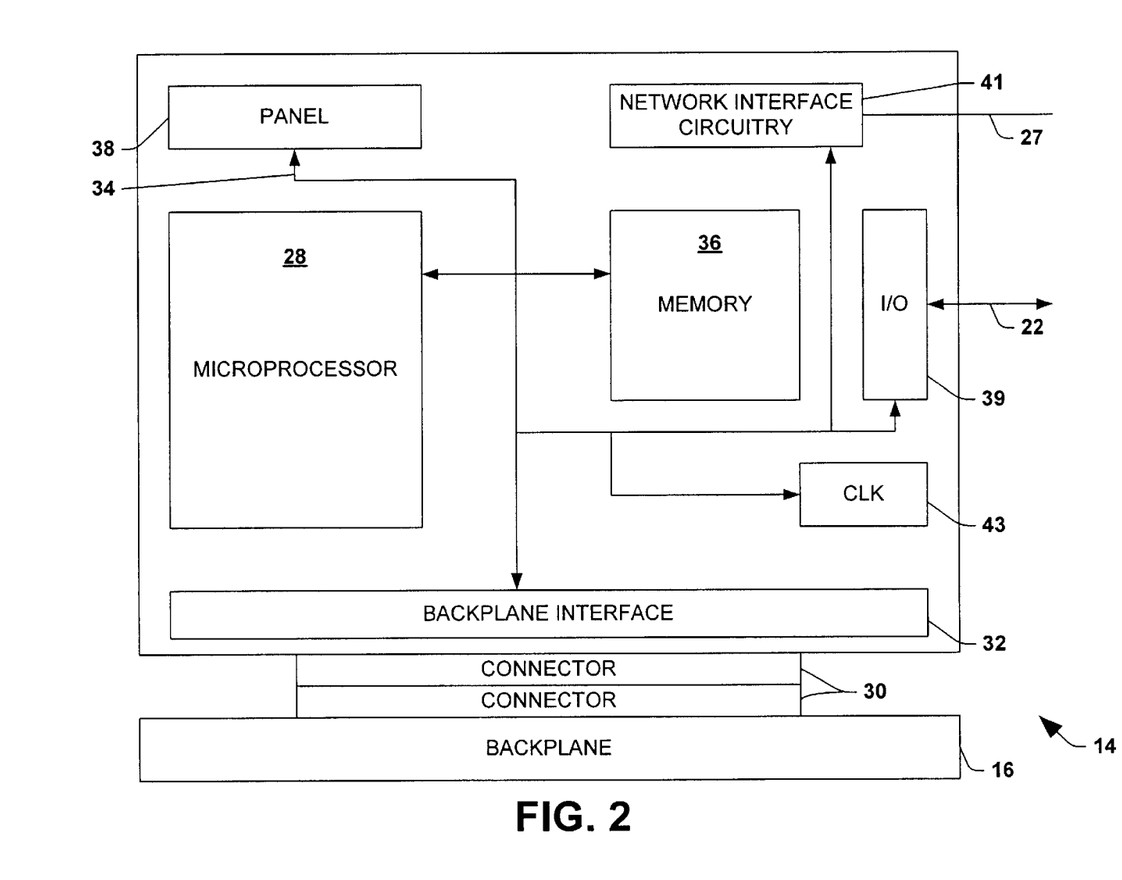
FIG. 2 is a schematic illustration of a single functional module of FIG. 1 illustrating its connection to a common backplane and communication links to communicate with other modules.

Referring also to FIG. 2, each functional module 14, is attached to the backplane 16 by means of a separable electrical connector 30 that permits the removal of the module 14 from the backplane 16 so that it may be replaced or repaired without disturbing the other modules 14. The backplane 16 provides the module 14 with both power and a communication channel to the other modules 14. Local communication with the other modules 14 through the backplane 16 is accomplished by means of a backplane interface 32 which electrically connects the backplane 16 through connector 30. The backplane interface 32 monitors messages on the backplane 16 to identify those messages intended for the particular module 14, based on a message address being part of the message and indicating the message destination. Messages received by the backplane interface 32 are conveyed to an internal bus 34 in the module 14.

The internal bus 34 joins the backplane interface 32 with a memory 36, a microprocessor 28, front panel circuitry 38, I/O interface circuitry 39 (if the module is an I/O module 20) and communication network interface circuitry 41 (if the module is a communication module 24). The microprocessor 28 may be a general purpose microprocessor providing for the sequential execution of instructions contained in memory 36 and the reading and writing of data to and from the memory 36 and the other devices associated with the internal bus 34. The microprocessor 28 includes an internal clock circuit (not shown) providing the timing of the microprocessor 28 but may also communicate with an external clock 43 of improved precision. This clock 43 may be a crystal controlled oscillator or other time standard including a radio link to an external time standard. The precision of the clock 43 may be recorded in the memory 36 as a quality factor. The panel circuitry 38 includes status indication lights such as are well known in the art and manually operable switches such as for locking the module 14 in the off state.

The memory 36 may comprise programs executed by the microprocessor 28 to provide the functions as will be described and also variables and data necessary for the execution of those programs. For I/O modules 20, the memory 36 may also include an I/O table holding the current state of inputs and outputs received from and transmitted to the industrial controller 10 via the I/O modules 20. The module 14 may be adapted to perform the various methodologies of the invention, via hardware configuration techniques and/or by software programming techniques. In addition, the memory 36 may be adapted to store wakeup time information as illustrated and described further hereinafter.

Figure 3:
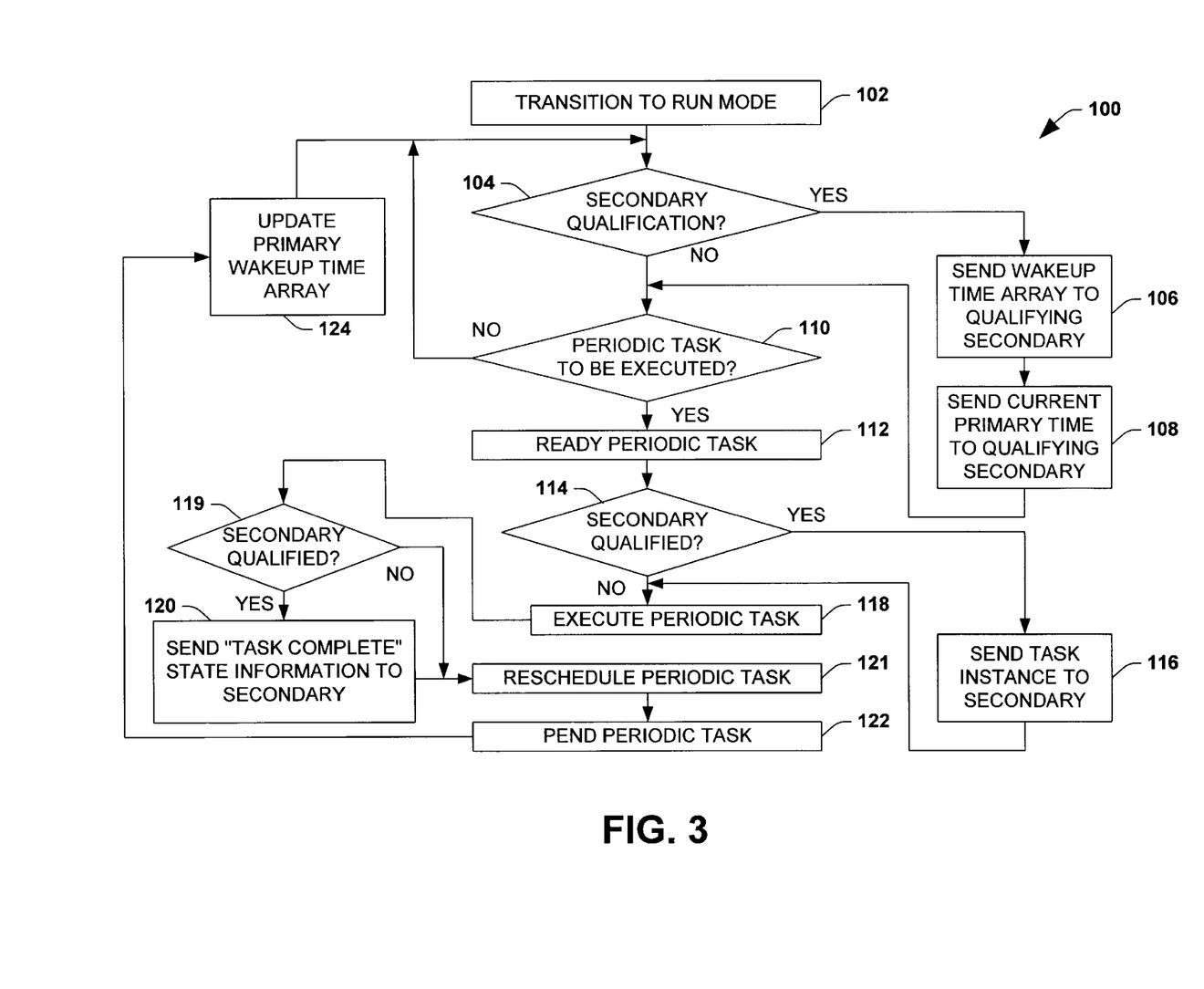
FIG. 3 is a flow diagram illustrating an exemplary method in accordance with an aspect of the invention.

Referring now to FIG. 3, an exemplary method 100 is illustrated for operating a primary controller (as illustrated and described in further detail hereinafter with respect to FIGS. 8 and 9) in a redundant control system. Although the method 100 is illustrated and described herein as a series of steps, it will be appreciated that the present invention is not limited by the illustrated ordering of steps, as some steps may occur in different orders and/or concurrently with other steps apart from that shown and described herein, in accordance with the invention. In addition, not all illustrated steps may be required to implement a methodology in accordance with the present invention. Moreover, it will be appreciated that the method 100 may be implemented in association with the apparatus and systems illustrated and described herein as well as in association with other systems not illustrated. Further in this regard, a single controller or control module may be adapted to implement the method 100 when operating as a primary redundant system controller, as well as to implement other methods described below, when operating as a redundant system secondary controller.

The method 100 begins at step 102, wherein the primary controller transitions into a run or execute mode, for example, from another operating mode (e.g., program mode or debug mode). A determination is made at step 104 as to whether an associated secondary controller is being qualified (e.g., in a qualification or synchronizing state). If the associated secondary controller is in the qualification state, the primary controller sends wakeup time information to the secondary at step 106, wherein the wakeup time information comprises at least one wakeup time value corresponding to at least one periodic task associated with the process. In the exemplary method 100, the primary controller sends a wakeup time array to the qualifying secondary controller at step 106, wherein the wakeup time array includes a plurality of wakeup time values corresponding to a plurality of periodic tasks associated with the controlled process. However, it will be recognized that the wakeup time information may alternatively comprise many formats other than an array, within the scope of the present invention.

According to another aspect of the invention, the primary controller may further send a current time value to the secondary controller during qualification at step 108. As illustrated and described hereinafter with respect to FIGS. 4–7, the secondary controller may employ the current primary controller time value to correct the wake up time information, for example, by comparing the primary current time value with a secondary current time value to compute a correction factor or value by which the wakeup time values may be scaled. In this manner, the invention provides for reducing or eliminating problems associated with unsynchronized autonomous timers in the primary and secondary controllers.

Once the primary controller has sent the wakeup time information and the current primary time value to a qualifying secondary controller at steps 106 and 108, or where the secondary is not currently in qualification, the method 100 proceeds to step 110. Here, a determination is made as to whether any periodic task needs to be executed. If not, the method 100 returns to step 104. If a periodic task needs to be run at step 110, the task is readied for execution at step 112, and a determination is made at step 114 as to whether the associated secondary controller is qualified. If so, the primary controller sends a task instance associated with the periodic task to the secondary controller at step 116. The task instance may comprise, for example, information relating to the execution of the periodic task by the primary controller. As illustrated and described in further detail hereinafter, the secondary controller may associate the task instance with the current time at which the task instance was received, in order to provide for scheduling a wakeup time for the periodic task in the event of a switchover.

Once the task instance is sent to the secondary controller at step 116, or where the secondary is not yet qualified, the method 100 proceeds to step 118, where the periodic task is executed by the primary controller. If the secondary is qualified at decision step 119, state information is sent to the secondary at step 120, indicating that the task has been completed. Otherwise, the periodic task is rescheduled at step 121 (e.g., the primary controller computes the next scheduled run time for the periodic task) and pends at step 122 (e.g., the periodic task pends on a delay according to the current time and the next calculated run time). The primary controller then updates the wakeup time information at step 124 before returning to step 104, such that if the secondary controller subsequently enters the qualification state, the latest wakeup time information (e.g., wakeup time array) will be provided to the secondary controller (e.g., via step 106 as described above).

Figure 4:
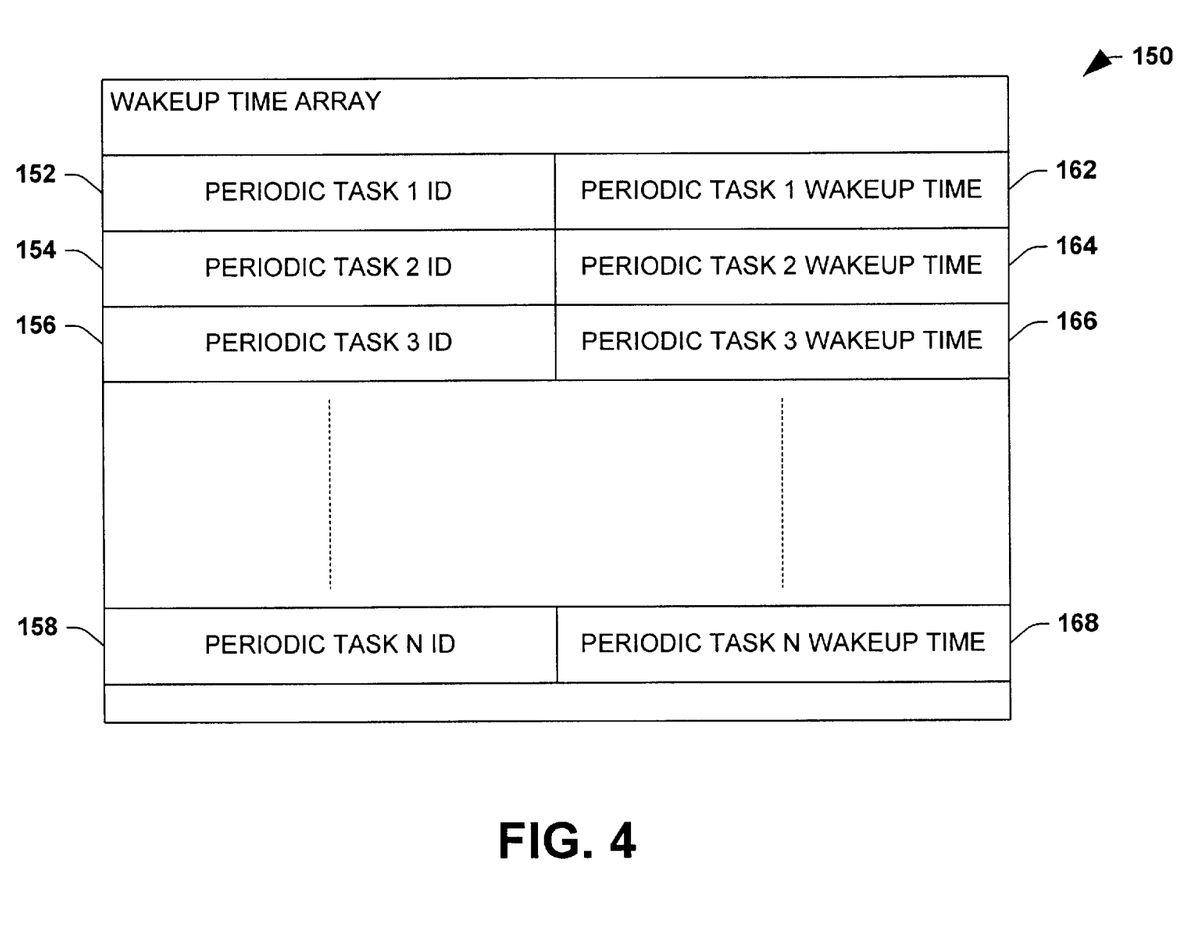
FIG. 4 is a schematic illustration of an exemplary wakeup time array in accordance with another aspect of the invention.

Referring Briefly to FIG. 4, an exemplary wakeup time array 150 is illustrated having a plurality of periodic task identifiers 152, 154, 156, and 158, as well as corresponding periodic task wake up time values 162, 164, 166, and 168, respectively. The primary controller may provide the secondary controller with the exemplary wakeup time array 150 during qualification of the secondary controller (e.g., at step 106 of method 100), in accordance with an aspect of the invention. In addition, the primary may provide a current primary time value (e.g., at step 108 of method 100) during secondary qualification, wherein the wakeup time array and the current primary time value may be included within a single message to the secondary controller. The secondary controller, in turn, may determine a current time correction value (e.g., the difference between the current primary time value and the current secondary time value), which is then employed in order to correct the wakeup time array 150. Thus, the secondary controller may scale or adjust the periodic task wake up time values 162, 164, 166, and 168 according to the current time correction value in accordance with another aspect of the invention.

In accordance with another aspect of the invention, an exemplary method 200 is illustrated in FIGS. 5–8 for operating a secondary controller in a redundant control system. While the exemplary method 200 is illustrated and described herein as a series of steps, it will be appreciated that the present invention is not limited by the illustrated ordering of steps, as some steps may occur in different orders and/or concurrently with other steps apart from that shown and described herein, in accordance with the invention. In addition, not all illustrated steps may be required to implement a methodology in accordance with the present invention. Moreover, it will be appreciated that the method 200 may be implemented in association with the apparatus and systems illustrated and described herein as well as in association with other systems not illustrated.

Figure 5:
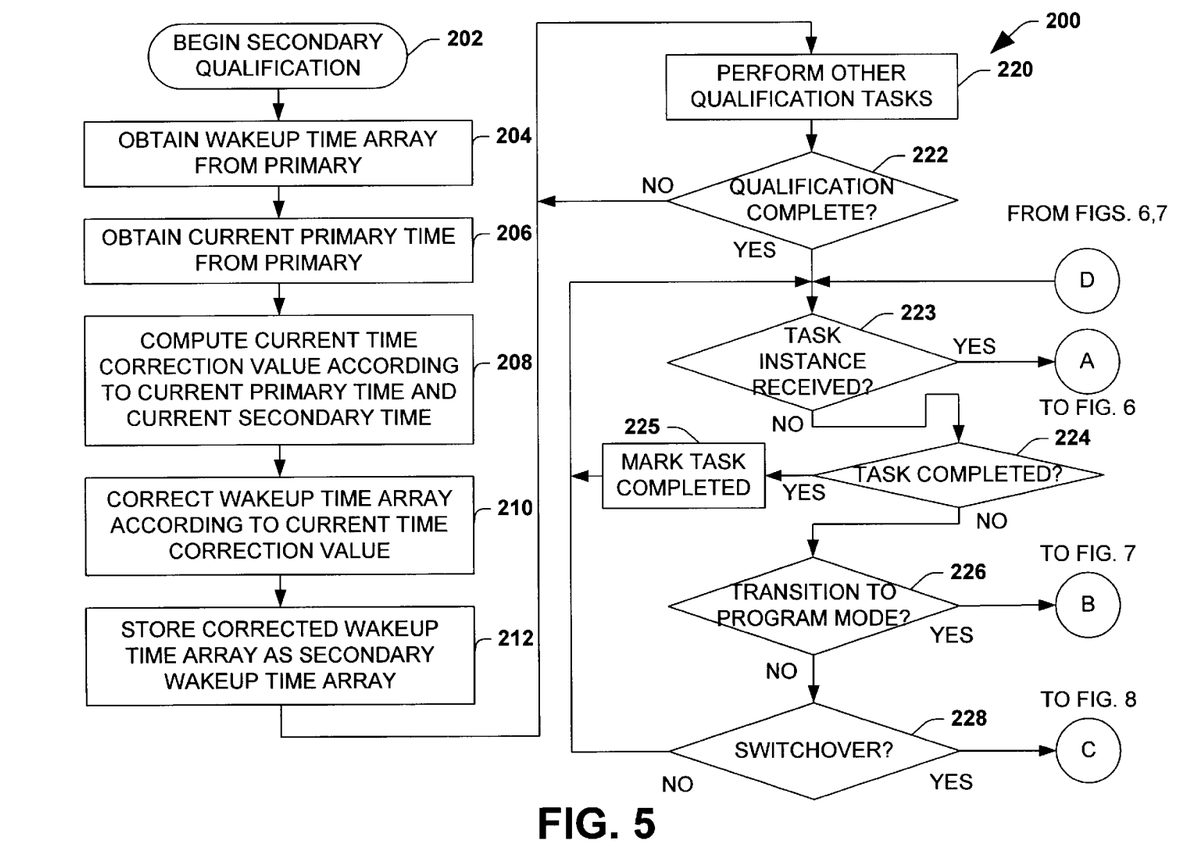
FIG. 5 is a flow diagram illustrating another exemplary method in accordance with the invention.

As illustrated in FIG. 5, qualification of the secondary controller begins at step 202, after which wakeup time information is obtained at step 204 from the primary controller. As illustrated and described above, the wakeup time information comprises at least one wakeup time value corresponding to at least one periodic task associated with the process, and moreover may comprise a wakeup time array (e.g., wakeup time array 150 of FIG. 4) having a plurality of wakeup time values corresponding to a plurality of periodic tasks associated with the process. One or more periodic tasks associated with a process being controlled by the redundant control system may be executed or scheduled for execution in the secondary controller according to the wakeup time information from the primary controller after a switchover event.

In addition, the exemplary method 200 comprises obtaining a current primary time value from the primary controller at step 206, and correcting the wakeup time information from the primary controller according to the current primary time value and a current secondary time value at steps 208 and 210. For example, a comparison may be performed at step 208 of the current primary time value from the primary controller with the current secondary time value, and a current time correction value may be computed or generated according to the comparison (e.g., the difference therebetween). The secondary controller may then use the current time correction value in scaling the wakeup time information from the primary controller to obtain the corrected wakeup time information at step 210. For instance, the secondary controller may scale or adjust the periodic task wake up time values 162, 164, 166, and 168 of the exemplary wakeup time array 150 according to the current time correction value. The corrected wakeup time information (e.g., a corrected wakeup time array) may then be stored at step 212 for use in running one or more periodic tasks in the event a switchover occurs.

Other qualification tasks may then be performed at step 220 and a determination is made at step 222 as to whether the qualification process is complete. At this point, it will be noted that the qualification process may comprise several steps or phases (not shown) with various tasks associated therewith. In addition to obtaining wakeup time information and the current primary time and processing associated therewith (e.g., steps 204–212), the qualification may also include transferring data and program state information from the primary controller to the secondary controller, such as via system redundancy modules associated with the primary and secondary controllers, which tasks may be performed at step 220. It will be further appreciated that the qualification steps may occur in any order in accordance with the invention. The determination at step 222 of the completion of qualification may comprise verifying that the secondary controller has an updated version of data, connections, and program state, and is capable of assuming control of the associated process upon a switchover event (e.g., primary controller failure). If not, the method 200 returns to step 220 for performance of further tasks associated with qualification.

Once the secondary controller is qualified at step 222, the method 200 determines whether a task instance has been received or obtained from the primary controller at step 223. If not, a determination is made at step 224 as to whether the periodic task is completed. If so, the task is marked as completed at step 225 and the method 200 returns to step 223. If the task is not completed at step 224, a determination is made at step 226 as to whether a transition to program mode has been initiated (e.g., by a user or an event). If not, the method 200 determines whether a switchover event has occurred at step 228. If no switchover, the qualified secondary controller continues back through steps 223, 224, 225, 226, and 228.

Figure 6:
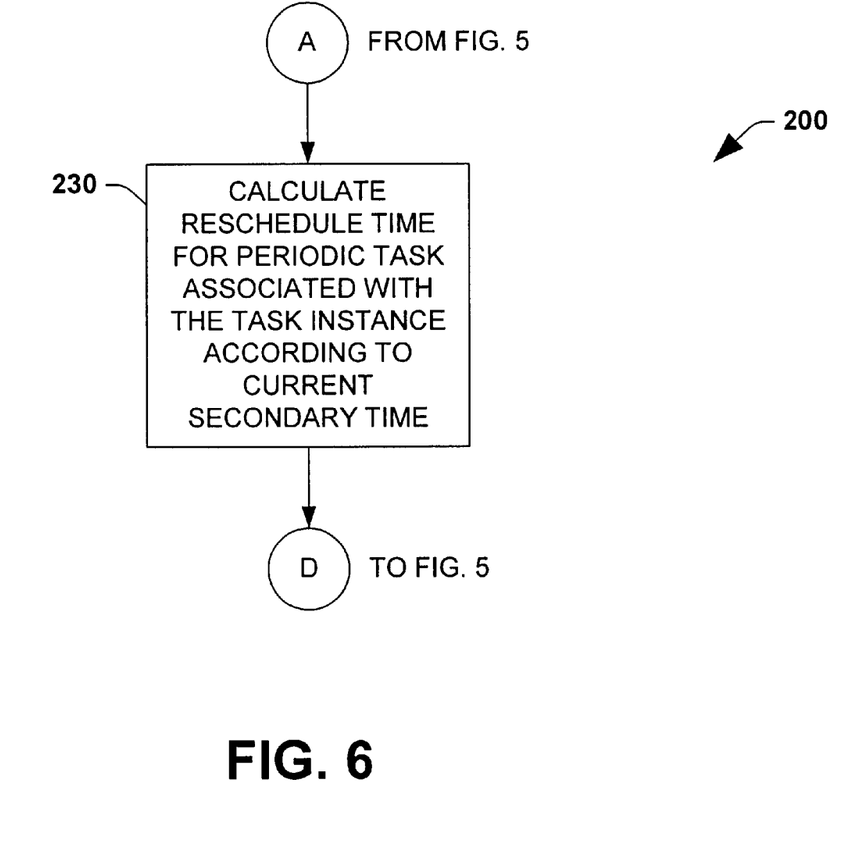
FIG. 6 is a flow diagram further illustrating the method of FIG. 5.

Referring also to FIG. 6, if a task instance is received from the primary controller at decision step 223, the method 200 proceeds to step 230. The task instance may comprise information relating to the execution of at least one periodic task by the primary controller. The qualified secondary may subsequently employ this information in running the periodic task after a switchover event. At step 230, a reschedule time is calculated for the periodic task according to the current secondary time. For example, the task instance may identify the periodic task, and the secondary controller may schedule the periodic task for execution at step 230 according to the time when the task instance was obtained from the primary controller after a switchover event. This may include computing a reschedule time for the periodic task according to the time when the task instance was obtained from the primary controller, and according to a default period associated with the periodic task. Thereafter, the method 200 returns to step 223 as illustrated and described above.

Figure 7:
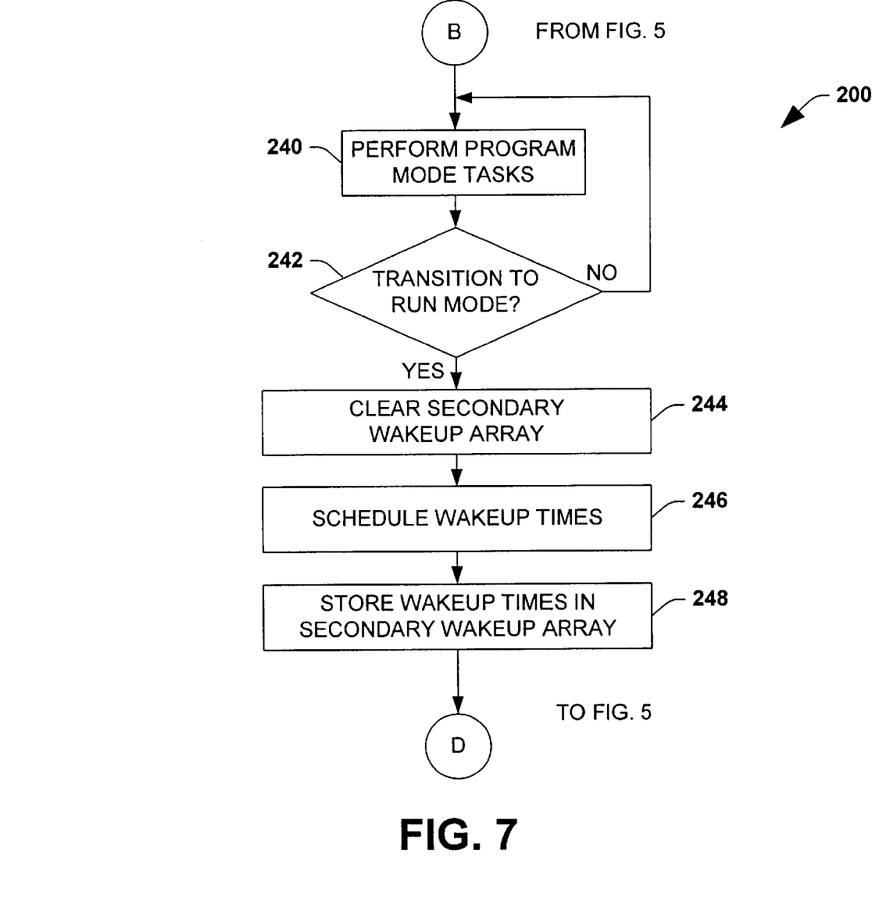
FIG. 7 is a flow diagram further illustrating the method of FIGS. 5–6.

Referring briefly to FIGS. 5 and 7, if a transition to program mode is detected at step 226, the method 200 proceeds to step 240 of FIG. 7, whereat one or more program mode tasks are performed. At step 242, a determination is made as to whether a transition to run mode has occurred. If not, the method 200 returns to perform further program mode tasks at step 240. If a transition to run mode is detected at step 242, the secondary wakeup time array is cleared at step 244, and wakeup times for periodic tasks are scheduled at step 246. The scheduled wakeup times are then stored in the secondary wakeup time array at step 248, and the method 200 returns to step 223 of FIG. 5.

Figure 8:
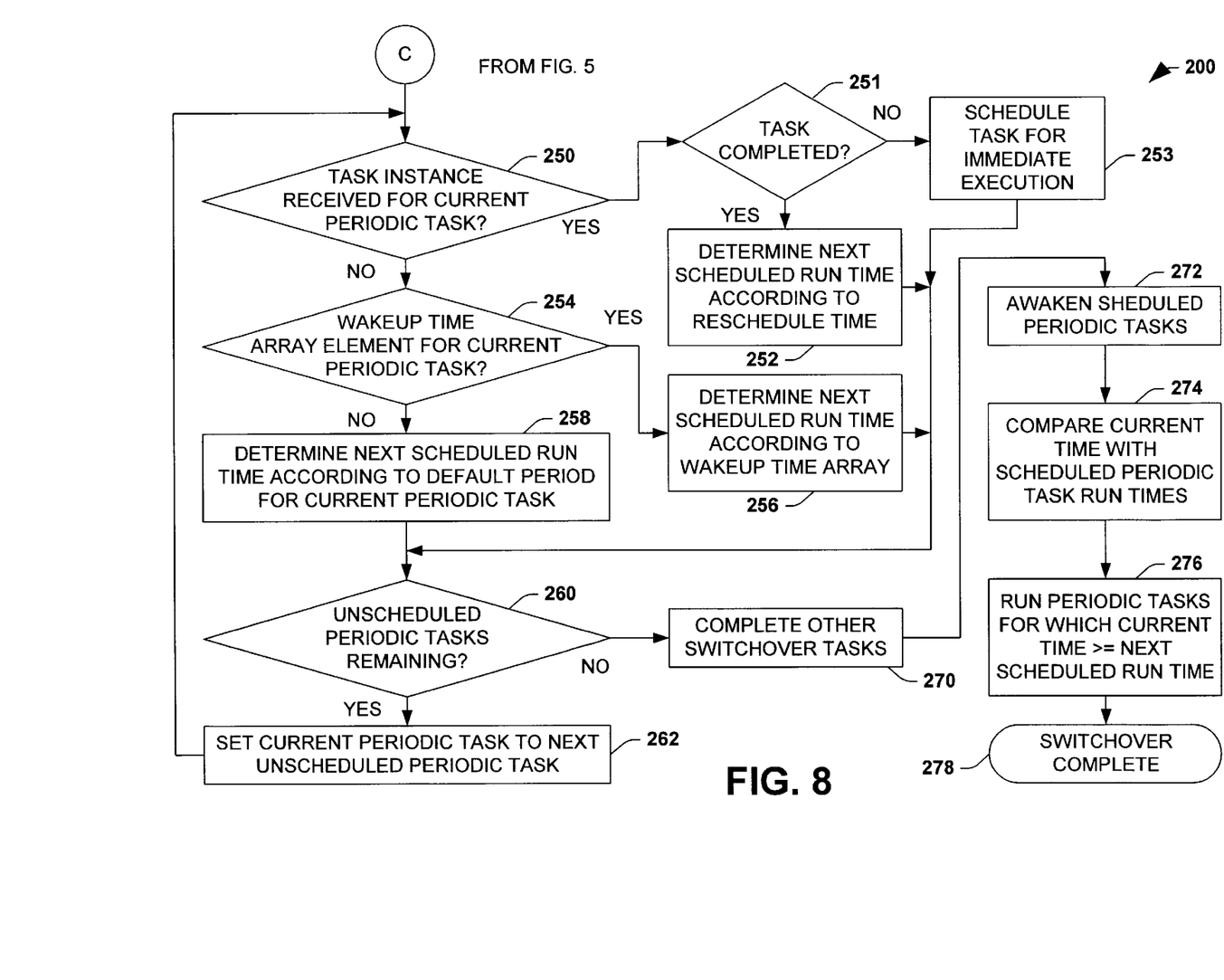
FIG. 8 is a flow diagram further illustrating the method of FIGS. 5–7.

Referring also to FIG. 8, if a switchover event has occurred at step 228 of FIG. 5, the method 200 proceeds to the steps of FIG. 8, where wakeup times for periodic tasks are scheduled. For such a task, a determination is made at step 250 as to whether an associated task instance has been received. If so, a determination is made at step 251 as to whether the task was completed. For example, the primary may send state information to the secondary indicating that the task has been completed. If no such indication has been received, the task may be scheduled for immediate execution at step 253. Otherwise, the next scheduled run time for the current periodic task is determined at step 252 according to the corresponding reschedule time (e.g., calculated at step 230 when the task instance was received after qualification of the secondary controller). If no such task instance was received for the current periodic task, the method 200 proceeds to step 254, whereat a determination is made as to whether the wakeup time information (e.g., wakeup time array 150 obtained at step 204) includes an element corresponding to the current periodic task. If so, the next scheduled run time for the periodic task is determined at step 256. It will be appreciated that where a corrected wakeup time array has been created and stored at steps 210 and 212, that the corrected or secondary wakeup time array may be consulted at step 256 in order to determine the next scheduled run time for the periodic task.

If no task instance was received, and no wakeup time information received with respect to the current periodic task (e.g., NO at decision steps 250 and 254), the next scheduled run time is determined at step 258 according to the default period associated with the periodic task. If any remaining unscheduled periodic tasks are present at decision step 260, the method 200 proceeds to step 262 where the next unscheduled periodic task is obtained. The method proceeds in like fashion through steps 250–262 until all the periodic tasks have been scheduled at step 260. Thereafter, any remaining switchover tasks are completed at step 270.

At step 272, the scheduled periodic tasks are awakened, and the current secondary time is compared with the scheduled periodic task run times at step 274. At step 276, any such periodic tasks for which the current secondary time is greater than or equal to the next scheduled run time, are executed. In this case, the scheduled run time has passed prior to the actual switchover from primary to secondary redundant control, and the method 200 reduces switchover latency by immediately running such tasks. The switchover is then complete at step 278.

The method 200 thus provides for reduction or elimination of switchover latency for periodic tasks associated with a system or process in a redundant control system. In this regard, the exemplary methods 100 and 200 (e.g., for operating the primary and secondary redundant controller partners, respectively) address timing issues related to switchover and qualification processes in such a redundant control system. For example, if a switchover event occurs during the time that a periodic task is pending (e.g., in the primary controller), the methodologies of the present invention ensure, to the extent possible, that the task is readied for timely execution on the secondary (e.g., the new primary) controller after switchover, in order to minimize the disruption of the periodicity of the task.

It will be further noted in this regard, that the invention contemplates and accounts for differences in the current time values associated with the primary and secondary controllers (e.g., via the correction or scaling of the wakeup time information sent from the primary to the secondary). For instance, the primary and secondary controllers may include internal timers, such as hardware or software timers, which may not be synchronized. The correction of the wakeup time information (e.g., the wakeup time array 150) by the secondary controller accounts for such differences, thus allowing more precise scheduling of the periodic tasks after a switchover event occurs.

The invention, furthermore, provides for periodic task scheduling in various timing situations. For instance, where secondary qualification and switchover occur prior to the first execution of a periodic task, the primary controller updates the wakeup time information (e.g., at step 124 in FIG. 3), and provides this information to the qualifying secondary at step 106. In this manner, the secondary controller is provided with sufficient task wakeup information at qualification in order to switchover and reschedule the task (e.g., via steps 250–256 of FIG. 8) to wait (e.g., pend) only the remaining time in its associated period, rather than the entire period. Furthermore, as mentioned above, the invention provides for correction of any differences in the internal timers of the primary and secondary controllers.

In the situation where a periodic task is executed after the secondary is qualified, the invention provides for the primary controller to send a corresponding task instance (e.g., at step 116 of FIG. 3) from which the qualified secondary can determine the next scheduled run time therefor after switchover (e.g., at step 252 of FIG. 8). Rather than being continually provided with the primary controller's wakeup time information, the invention allows the secondary to be provided with a wakeup time array (e.g., array 150) during qualification, and subsequently to obtain task instances thereafter for periodic tasks readied and executed once qualified. Thus, when a switchover occurs, the secondary controller may use the arrival times of the task instances as well as the wakeup time information provided during qualification to effectively determine the appropriate next scheduled run times for the periodic tasks.

Figure 9:
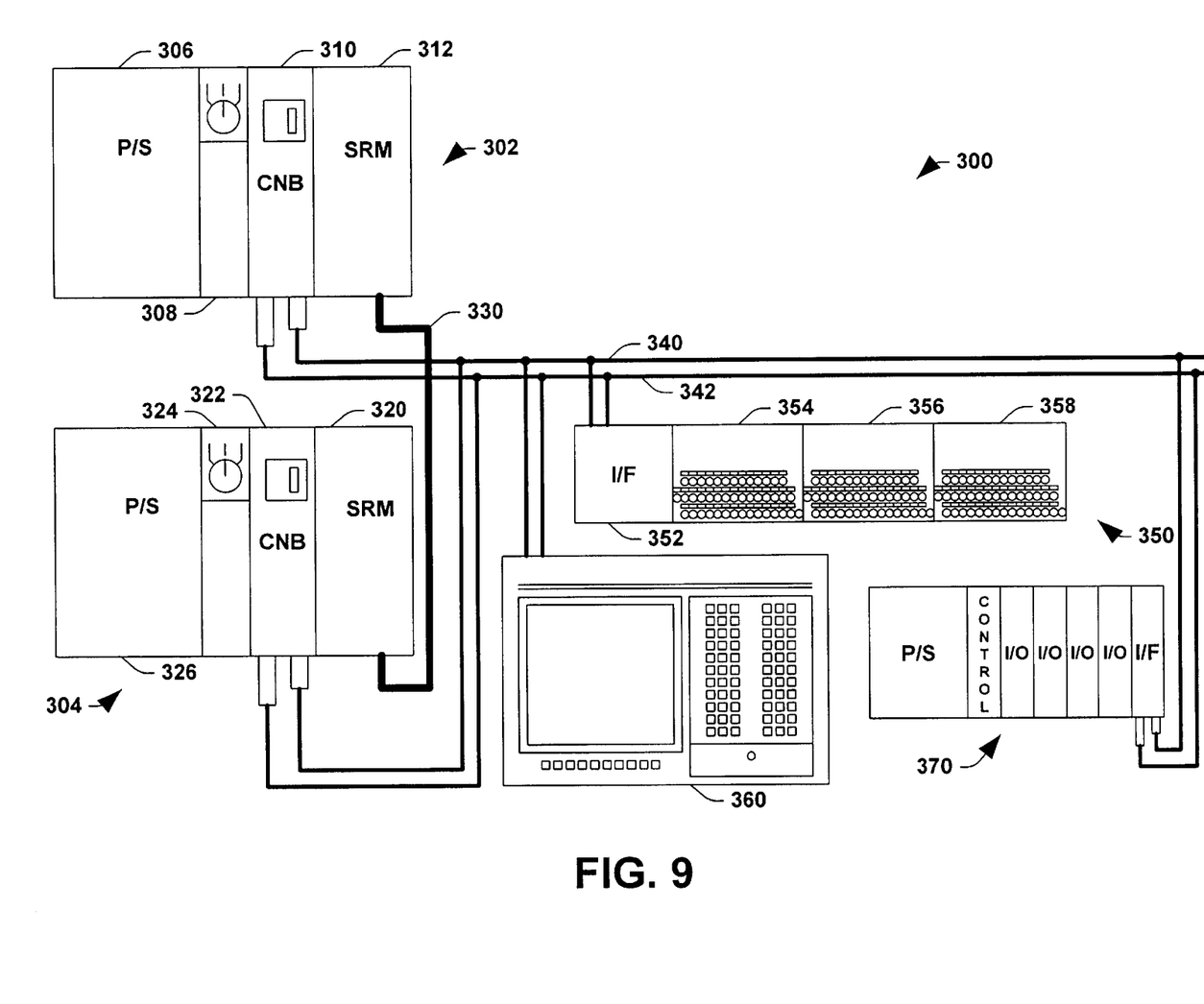
FIG. 9 is a schematic illustration of an exemplary redundant control system in accordance with the invention.

Referring now to FIG. 9, an exemplary redundant control system 300 is illustrated in which the various aspects and methodologies of the invention may be carried out. The system 300 includes a primary control chassis 302 and a similar secondary control chassis 304. The primary control chassis includes a power supply module 306, a controller module 308, a network bridge module 310 (e.g., adapted to provide network interfacing to one or more network types, such as DeviceNet, EtherNet, ControlNet, etc.) and a system redundancy module 312. The system redundancy module 312 is operatively connected with a corresponding secondary system redundancy module 320 in the secondary control chassis 304, whereby the modules in the primary and secondary control chassis 302 and 304, respectively, may exchange data, program state information, and other information in order to implement a redundant control strategy.

The secondary control chassis further comprises a network bridge module 322, a controller module 324, and a power supply module 326, similar to the modules 310, 308, and 306, respectively, of the primary control chassis 302. The system redundancy modules 312 and 320 are interconnected via a redundancy cable 330 for communication of data and other information therebetween. The network bridge modules 310 and 322 provide communications interfacing between the corresponding controller modules 308 and 324, respectively, and a pair of redundant networks 340 and 342. The networks 340 and 342 provide for redundant cabling between the primary and secondary control chassis 302 and 304 and other control system components. In this regard, the routing of the individual networks 340 and 342 may be spaced from one another to ensure survival of one of the networks 340 and 342 if the other is damaged (e.g., severed) or otherwise becomes inoperative. Thus, the network bridge modules 310 and 322 may be adapted to provide messages to each of the networks 340 and 342, and to receive messages from both of the networks 340 and 342.

The control of a process (not shown) may be achieved through communication from the primary controller module 308 with other control devices on the networks 340 and 342 via the network bridge module 310. For example, the redundant control system 300 may comprise an I/O rack 350 comprising a network interface module 352 providing communications interfacing between the networks 340 and 342 and one or more I/O modules 354, 356, and 358. The networks 340 and 342 further provide communications with a user interface device 360 and another control chassis 370, which itself may include I/O, communications, controller, and/or power supply modules (not numerically designated). The networks 340 and 342 may be of any type and support any network protocol, including but not limited to DeviceNet, EtherNet, ControlNet, etc. The networks 340 and 342, moreover, may provide for communication with other devices on other networks (not shown), for example, via network bridging devices (not shown), whereby the modules 308, 324 may exchange data and other information therewith.

According to another aspect of the invention, the controller modules 308 and 324 may be adapted to operate as a redundant controller pair, wherein one of the modules 308, 324 assumes a primary controller mode of operation and the other assumes a secondary controller operational mode. Upon a redundant system switchover, the modules 308, 324 effectively switch roles, with the former primary becoming the secondary, and vice versa. In this regard, it will be appreciated that the modules 308, 324 may be adapted to implement one or both of the exemplary methods 100 and 200, according to whether they are currently operating as a primary controller or as a secondary controller. Furthermore, the methodologies of the invention may be implemented in the modules 308, 324 through one or both of hardware and software technologies through appropriate setup, programming, or configuration thereof as is known. In particular, the methodologies of the present invention may be implemented via processors in the modules 308, 324 according to programs in the form of processor executable instructions stored within the modules 308, 324. It will thus be appreciated that the modules 308, 324 may, but need not, include identical or similar hardware and software.

According to the invention, the controller modules 308, 324 are adapted to operate as a primary controller for controlling a process in a redundant control system (e.g., system 300) having a secondary controller adapted to assume control of the process upon a switchover event. The adaptation of the control modules 308, 324 in implementing the various aspects of the invention may be accomplished, for example, via appropriate software programming and hardware configuration techniques, or combinations thereof. In addition, the modules 308, 324 are adapted to send wakeup time information to the secondary controller during qualification of the secondary controller, wherein the wakeup time information comprises at least one wakeup time value corresponding to at least one periodic task associated with the process. The modules 308, 324 may thus include a wakeup time array having a plurality of wakeup time values corresponding to a plurality of periodic tasks associated with the process. Furthermore, when operating as a primary controller, the modules 308, 324 are adapted to send a current time value to the secondary controller during qualification of the secondary controller, and to send a task instance associated with a periodic task to the secondary controller as the periodic task is readied for execution if the secondary controller is qualified.

When operating as a secondary controller, the modules 308, 324 may be adapted to assume control of a process from a primary controller in a redundant control system upon a switchover event. In accordance with another aspect of the invention, the modules 308, 324 may obtain wakeup time information (e.g., a wakeup time array) from the primary controller during qualification, and are adapted to run one or more periodic tasks according to the wakeup time information from the primary controller after a switchover event.

Furthermore, the modules 308, 324 (e.g., when operating as a secondary controller) may be adapted to obtain a current primary time value from the primary controller during qualification and to correct the wakeup time information from the primary controller according to the current primary time value and a current secondary time value. The modules 308, 324 may then employ the corrected wakeup time information in scheduling periodic tasks for execution after switchover. The correction or scaling of the wakeup time information may be done, for instance, by appropriate software programming and/or hardware configuration within the modules 308, 324 in order to perform a comparison of the current primary time value from the primary controller with the current secondary time value, in order to generate or compute a current time correction value according to the comparison. The modules 308, 324 may then scale the wakeup time information from the primary controller to obtain the corrected wakeup time information.

The control modules 308, 324, moreover, may be adapted to obtain one or more task instances from the primary controller when qualified, and to run or execute a periodic task according to the task instance after a switchover event. In this regard, the modules 308, 324 may schedule the periodic task for execution according to the time when the associated task instance was obtained from the primary controller. The modules 308, 324 may accordingly comprise hardware and/or software for computing a reschedule time for the periodic task according to the time when the at least one task instance was obtained from the primary controller and according to a default period associated with the periodic task.

Although the invention has been shown and described with respect to certain illustrated aspects, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (i.e., that is functionally equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the steps of the various methods of the invention.

In addition, while a particular feature of the invention may have been disclosed with respect to only one of several implementations, such feature may be combined with one or more other features of the other implementations as may be desired and advantageous for any given or particular application. As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. Furthermore, to the extent that the terms "includes", "including", "has", "having", and variants thereof are used in either the detailed description or the claims, these terms are intended to be inclusive in a manner similar to the term "comprising."

What is claimed is:

1. A redundant control system for controlling an industrial process, comprising:

primary and secondary control components, wherein the primary control component is adapted to control the process, and wherein the secondary control component is adapted to assume control of the process according to a switchover event;

wherein the secondary control component receives wakeup time information having at least one wakeup time element corresponding to a periodic task and a current time value from the primary control component during qualification; and wherein the secondary control component schedules a run time for the periodic task after the switchover event based on the wakeup time information corresponding to the periodic task and the current time value from the primary control component.

2. In a redundant industrial control system, a method for ensuring timely execution of periodic tasks, comprising:

receiving a wakeup time array having at least one wakeup time element corresponding to a periodic task and a current time value from a primary control module; and scheduling a run time for the periodic task at switchover based on the wakeup time element corresponding to a periodic task and the current time value from the primary control module.

3. The method of claim 2, further comprising:

receiving a task instance corresponding to the periodic task from the primary control module; and scheduling a run time for the periodic task at switchover based on the task instance.

4. The method of claim 3, further comprising receiving state information indicating that the periodic task has completed.

5. The method of claim 3, further comprising executing the periodic task at switchover if no state information has been received indicating the periodic task has completed.

6. The method of claim 3, further comprising scheduling a run time for the periodic task at switchover based on a default period associated with the periodic task if no task instance and no wakeup time element was received corresponding to the periodic task.

7. In a redundant control system having a primary controller for controlling a process and a secondary controller adapted to assume control of the process upon a switchover event, a method for operating the primary controller, comprising:

sending wakeup time information to the secondary controller during qualification of the secondary controller, wherein the wakeup time information comprises at least one wakeup time value corresponding to at least one periodic task associated with the process.

8. The method of claim 7, wherein the wakeup time information comprises a wakeup time array having a plurality of wakeup time values corresponding to a plurality of periodic tasks associated with the process.

9. The method of claim 7, further comprising sending a current time value to the secondary controller during qualification of the secondary controller.

10. The method of claim 9, further comprising sending a task instance associated with a periodic task to the secondary controller as the periodic task is readied for execution if the secondary controller is qualified.

11. The method of claim 10, further comprising sending state information indicating that the task has completed.

12. The method of claim 7, further comprising sending a task instance associated with a periodic task to the secondary controller as the periodic task is readied for execution if the secondary controller is qualified.

13. The method of claim 7, further comprising updating the wakeup time information when a periodic task is rescheduled.

14. In a redundant control system having a primary controller for controlling a process and a secondary controller adapted to assume control of the process upon a switchover event, a method for operating the secondary controller, comprising:

obtaining wakeup time information from the primary controller during qualification of the secondary controller, wherein the wakeup time information comprises at least one wakeup time value corresponding to at least one periodic task associated with the process; and running the at least one periodic task according to the wakeup time information from the primary controller after a switchover event.

15. The method of claim 14, further comprising:

obtaining a current primary time value from the primary controller during qualification of the secondary controller; and correcting the wakeup time information from the primary controller according to the current primary time value and a current secondary time value;

wherein running at least one periodic task according to the wakeup time information comprises running the at least one periodic task according to corrected wakeup time information.

16. The method of claim 15, wherein correcting the wakeup time information comprises:

performing a comparison of the current primary time value from the primary controller with the current secondary time value;

generating a current time correction value according to the comparison; and scaling the wakeup time information from the primary controller to obtain the corrected wakeup time information.

17. The method of claim 14, wherein the wakeup time information from the primary controller comprises a wakeup time array having a plurality of wakeup time values corresponding to a plurality of periodic tasks associated with the process.

18. The method of claim 14, further comprising:

obtaining at least one task instance from the primary controller when the secondary controller is qualified, wherein the at least one task instance comprises information relating to the execution of the at least one periodic task by the primary controller; and running the at least one periodic task according to the at least one task instance after a switchover event.

19. The method of claim 18, wherein the at least one task instance identifies the at least one periodic task, and wherein running the at least one periodic task according to the at least one task instance comprises scheduling the at least one periodic task for execution in the secondary controller according to the time when the at least one task instance was obtained from the primary controller after a switchover event.

20. The method of claim 19, wherein scheduling the at least one periodic task for execution comprises computing a reschedule time for the at least one periodic task according to the time when the at least one task instance was obtained from the primary controller and a default period associated with the at least one periodic task.

21. The method of claim 18, further comprising executing the at least one periodic task after a switchover event where no notification has been received that the at least one periodic task has completed.

22. A primary controller for controlling a process in a redundant control system having a secondary controller adapted to assume control of the process upon a switchover event, and to send wakeup time information to the secondary controller during qualification of the secondary controller, wherein the wakeup time information comprises at least one wakeup time value corresponding to at least one periodic task associated with the process.

23. The primary controller of claim 22, wherein the wakeup time information comprises a wakeup time array having a plurality of wakeup time values corresponding to a plurality of periodic tasks associated with the process.

24. The primary controller of claim 22, further adapted to send a current time value to the secondary controller during qualification of the secondary controller.

25. The primary controller of claim 22, further adapted to send a task instance associated with a periodic task to the secondary controller as the periodic task is readied for execution if the secondary controller is qualified.

26. The primary controller of claim 22, further adapted to update the wakeup time information when a periodic task is rescheduled.

27. A secondary controller adapted to assume control of a process from a primary controller in a redundant control system upon a switchover event, and to obtain wakeup time information from the primary controller during qualification of the secondary controller, wherein the wakeup time information comprises at least one wakeup time value corresponding to at least one periodic task associated with the process; wherein the secondary controller is further adapted to run the at least one periodic task according to the wakeup time information from the primary controller after a switchover event.

28. The secondary controller of claim 27, further adapted to obtain a current primary time value from the primary controller during qualification of the secondary controller, and to correct the wakeup time information from the primary controller according to the current primary time value and a current secondary time value;

wherein the secondary controller runs the at least one periodic task according to corrected wakeup time information.

29. The secondary controller of claim 28, further adapted to perform a comparison of the current primary time value from the primary controller with the current secondary time value, to generate a current time correction value according to the comparison, and to scale the wakeup time information from the primary controller to obtain the corrected wakeup time information.

30. The secondary controller of claim 27, wherein the wakeup time information from the primary controller comprises a wakeup time array having a plurality of wakeup time values corresponding to a plurality of periodic tasks associated with the process.

31. The secondary controller of claim 27, further adapted to obtain at least one task instance from the primary controller when the secondary controller is qualified, wherein the at least one task instance comprises information relating to the execution of the at least one periodic task by the primary controller; wherein the secondary controller runs the at least one periodic task according to the at least one task instance after a switchover event.

32. The secondary controller of claim 31, wherein the at least one task instance identifies the at least one periodic task, the secondary controller being further adapted to schedule the at least one periodic task for execution in the secondary controller according to the time when the at least one task instance was obtained from the primary controller after a switchover event.

33. The secondary controller of claim 32, further adapted to compute a reschedule time for the at least one periodic task according to the rime when the at least one task instance was obtained from the primary controller and a default period associated with the at least one periodic task.

* * * * *